United States Patent [19]

Sutphen

[11] Patent Number: 4,787,970
[45] Date of Patent: Nov. 29, 1988

[54] PROCESS AND SYSTEM FOR DEWATERING METAL OXIDE SLUDGE

[75] Inventor: Russell L. Sutphen, Chittenango, N.Y.

[73] Assignee: Specialized Process Equipment, Inc., Syracuse, N.Y.

[21] Appl. No.: 170,364

[22] Filed: Mar. 18, 1988

Related U.S. Application Data

[63] Continuation-in-part of Ser. No. 41,442, Apr. 23, 1987, abandoned.

[51] Int. Cl.$^4$ .......................... B01D 9/04; B01D 17/00
[52] U.S. Cl. ....................................... 210/179; 62/544; 210/181; 210/182; 210/187
[58] Field of Search ............... 210/774, 737, 175, 179, 210/181, 182, 187; 62/532, 537, 540, 541, 542, 544, 545

[56] References Cited

U.S. PATENT DOCUMENTS 2,703,782  3/1955  Regan et al. .................... 210/774
3,817,048  6/1974  Burley ............................. 210/774

Primary Examiner—Frank Sever
Attorney, Agent, or Firm—Charles S. McGuire

[57] ABSTRACT

A process of the type employing freezing and thawing of metal hydroxide sludge to effect phase separation by gravity settling of solids to permit removal of the purified water, and a preferred system for carrying out the process. Commercially available refrigeration equipment, suitably modified and adjusted to operate in the freezing of sludge in sheets and breaking the sheets into relatively small pieces, is utilized in order to minimize the costs of hardware end controls. The frozen sludge particles are deposited in a melt tank containing a quantity of sludge which has previously been frozen and thawed. The thawed sludge is circulated from the melt tank through a line passing through the condenser of the refrigeration system to absorb heat rejected by the condensing refrigerant, and directed by a valve back to the melt tank to assist in thawing the frozen particles until the level in the tank reaches a predetermined maximum, and then to a settling area until the level of thawed sludge in the melt tank is reduced to a predetermined minimum. The primarily liquid and solid phases are separated after a desired amount of gravity settling.

12 Claims, 2 Drawing Sheets

PROCESS AND SYSTEM FOR DEWATERING METAL OXIDE SLUDGE

CROSS-REFERENCE TO RELATED APPLICATION

This application is a continuation-in-part of application Ser. No. 041,442, filed Apr. 23, 1987, now abandoned.

BACKGROUND OF THE INVENTION

The present invention relates to processes and systems for effecting phase separation of solids and liquid in metal hydroxide sludge and, more particularly, to novel and improved methods of metal hydroxide sludge dewatering involving the freezing and thawing of the sludge.

Metal salts such as aluminum sulfate (alum) have been used in treatment processes since the early 1900's for the removal of color and turbidity from raw water sources. These hydroloyzing metals react with the natural alkalinity in the raw water and form light fluffy floc particles. This floc includes the metal hydroxide particulate, raw water solids and a significant "water of hydration". Prior to the 1960's, alum sludges were most commonly returned to the stream or lake. With the advent of the Federal Pollutant Discharge Regulations, this practice is no longer allowed.

The hydroxide sludges are very difficult to dewater by ordinary means because of the water molecules that are bound in the sludge. The solids are not easily removed by gravity consolidation and draining. These gelatinous sludges will not exceed 6% to 8% solids (by dry weight) through natural gravity thickening in lagoons. A 20% solids concentration is generally considered the minimum for handling by earth moving equipment and landfilling. Alternative methods of dewatering the sludge are required to meet these conditions.

A common method of disposal of sludges became the discharging of the water plant waste to a sewage treatment system. The complexity of dewatering and the associated costs are then transferred to the sewer agency and are often reflected in associated discharge fees. When discharge to the sewers is not feasible, mechanical methods such as filter presses and centrifuges can be utilized to separate the solids from the water. Since the sludge does not dewater easily, it requires pretreatment with ploymers, line, and often fly ash. These materials add solid mass to the sludge while helping the sludge to release its bound water. Quite often the thickened sludge has to be treated at a pH above 10 standard units. This high pH can present problems in suitable disposal for both the sludge cake and filtrate. The chemical control is important in these mechanical dewatering processes. The chemical facilities not only add capital costs to sludge handling, but also increase the operation and maintenance costs. In addition, the nature of the sludge greatly affects the final solids concentration and characteristics of the dewatered solids.

Unlike the mechanical dewatering alternatives (which dewater alum sludge by adding solids and squeezing water out), freezing and thawing produces a permanent physical/chemical change in sludge characteristics. When the sludge undergoes complete freezing, the water crystalizes and breaks the bond of hydration. Upon thawing, the solid materials will separate and settle quite efficiently, with a water content low enough to permit handling of the solids by conventional techniques. The thawed sludge exhibits a more granular texture and will not return to its original gelatinous state when water is added.

It is known that freezing can change sludge of 2% to 6% solid concentration to 20% to 25% solids immediately following thawing. Since the solid material exhibits characteristics similar to fine sand, it will readily air dry and drain to concentrations greater than 40% solids (by weight). The resulting solids can be easily handled by earth moving equipment and are suitable for a landfill operation. A number of U.S. patents relate to methods and apparatus for separating solids from water by treatment involving freezing and thawing. For example, U.S. Pat. No. 3,713,303 discloses and pair of heat exchangers comprising tubes within casings and means for blowing air through the tubes at the end of each freezing cycle. U.S. Pat. No. 3,783,632 relates to apparatus for concentration of aqueous coffee extract including a tubular ice crystallizer and basket centrifuge ice separator.

Process patents in this field include U.S. Pat. No. 2,703,782, which describes the dewatering of sewage sludge by addition thereto of a coagulating agent, e.g., aluminum sulfate, then freezing, thawing and decanting, in a natural freezing-thawing manner of treatment of alum sludges. U.S. Pat. No. 3,098,733 relates to a refrigeration process for recovering fresh water from salt water which involves freezing and melting. Likewise, U.S. Pat. No. 3,253,419 discloses a refrigeration process for separation of components from a liquid mixture by fractional crystalization.

U.S. Pat. No. 3,817,048 discusses various prior apparatus and methods used in sludge treatment by freezing, thawing and decanting, and is directed to a process involving freezing the sludge in droplet form by contacting it with an inert and immiscible liquid, thawing the frozen droplets and then reducing the liquid content. U.S. Pat. No. 4,453,959 is concerned with a process for separating and purifying a crystalized component from a two-phase slurry of the crystalized component and liquified multi-component mixture by separation of the crystalized component in a purification process.

It is a principal object of the present invention to provide a process for removal of solids from water sludges by freezing, thawing and settling which is efficient and economical in relatively large-scale operations.

A further object is to provide a method for dewatering metal hydroxide sludge which makes maximum use of commercially available refrigeration equipment in a continuous-type process of freezing, thawing and effecting phase separation of water and solids.

Another object is to provide an efficient process for separating water and solids in metal hydroxide sludges utilizing a standard refrigeration circuit both to freeze and to assist in thawing of the sludge.

Other objects will in part be obvious and will in part appear hereinafter.

SUMMARY OF THE INVENTION

The process of the invention preferably employs certain elements of hardware and controls from otherwise conventional commercial ice-making systems in order to minimize the cost and complexity of carrying out the sludge phase separation process. Such conventional hardware includes an array of metal plates arranged in pairs in substantially vertical planes with spray nozzles for directing material on the plate surfaces, a recirculation tank, a refrigeration circuit for chilling the plates and means for breaking frozen material into smaller pieces. The ice, broken into pieces of a desired size is, of course, the end product in such prior ice-making operations.

In the process of the invention, incoming sludge is pumped to a recirculation tank. When the tank has been filled to a desired level, the supply of incoming sludge is stopped and sludge from the tank is then pumped to a distribution header and directed upon the outer surfaces of the plates. A refrigerant is circulated through a compressor-condenser refrigeration circuit having lines in contact with the plates to lower the temperature thereof below the freezing point of the sludge. Any sludge which does not freeze and adhere to the plate surfaces runs off by gravity, is directed by movable dampers into a trough from which it flows back to the recirculation tank, and continues to be recirculated through the distribution header onto the plate surfaces.

After a predetermined time, calculated to allow a desired degree of frozen sludge to accumulate on the plate outer surfaces, recirculation is stopped. Refrigerant continues to circulate through the lines for a further predetermined time to insure solidification of the frozen sheets of sludge adhering to the plates. Refrigerant circulation is then stopped and water from an external source is directed over the inner surfaces of the plates. The water raises the temperature of the plates, causing the frozen sheets of sludge to be released from the outer plate surfaces from which they fall by gravity. The position of the dampers is changed to permit the frozen sheets to drop into the mechanical breaking means, as the recirculation tank is again filled to continue the process. The frozen sludge is broken into pieces having a maximum transverse dimension of about 2 inches, which are dropped into a melt tank containing a supply of water and/or sludge which has previously been frozen and thawed and which is above the sludge freezing temperature.

A line from the melt tank is directed through the condenser of the refrigeration circuit where the thawed sludge absorbs heat rejected by the condensing refrigerant. The thawed sludge line is connected to a valve by which it is directed back to the melt tank to assist in melting the pieces of frozen sludge therein. When the level of thawed sludge in the melt tank has reached a predetermined maximum, the position of the valve is changed to direct the thawed sludge to a settling area where phase separation may take place, allowing the solids to settle by gravity and the liquid to be removed. The position of the valve is again changed after the level in the melt tank has dropped to a predetermined level to insure that some thawed sludge remains in the tank to assist in thawing the frozen sludge which is deposited therein as the process continues.

DETAILED DESCRIPTION

The process of the invention and a preferred embodiment of apparatus employed in the practise thereof are illustrated schematically in the accompanying drawings. Raw metal hydroxide sludge from a holding area is supplied through line 10 by means of pump 12 to tank 14. For purposes of the present disclosure, the term "sludge" refers to water to which a metal hydroxide coagulent, e.g., aluminum sulfate, has been added, bringing the total solids content to not more than 10% (typically 2% to 5%) by weight, of which typically up to 50% is minerals and other solid foreign matter, the balance being the material added as a coagulent to assist in removing the initially present solids.

Figure 2:
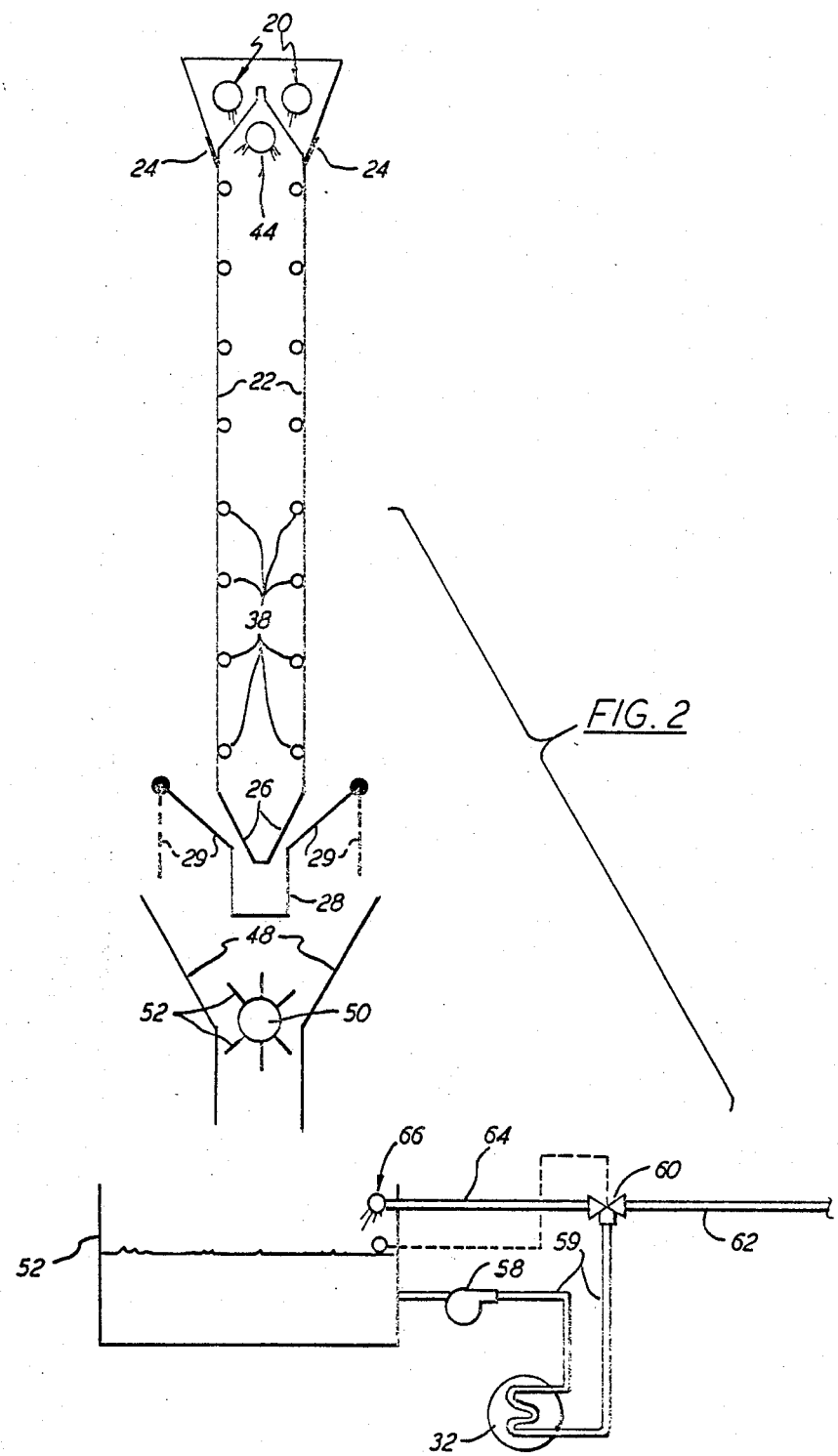
FIG. 2 is a side elevation view of certain elements of the apparatus shown in front elevation in FIG. 1.

When the level of liquid sludge in tank 14 reaches a predetermined level as determined, for example, by a conventional float gauge (not shown), pump 12 is turned off to stop the flow of incoming sludge through line 10. Pump 16 is then actuated to circulate the sludge from tank 14 through line 18 to distribution header 20, arranged to direct the liquid sludge on the outwardly facing surfaces of plates 22. As shown in FIG. 2, distribution header 20 comprises a pair of pipes with nozzles or other openings through which the liquid sludge is directed downwardly onto upper portions of plates 22, and is assisted by flexible strips 24 in flowing down the outwardly facing surfaces. The size (surface area) and number of pairs of plates 22 used in the system is a design feature determined by the nature of the material being handled, as well as the intended processing rate or capacity of the system.

Figure 1:
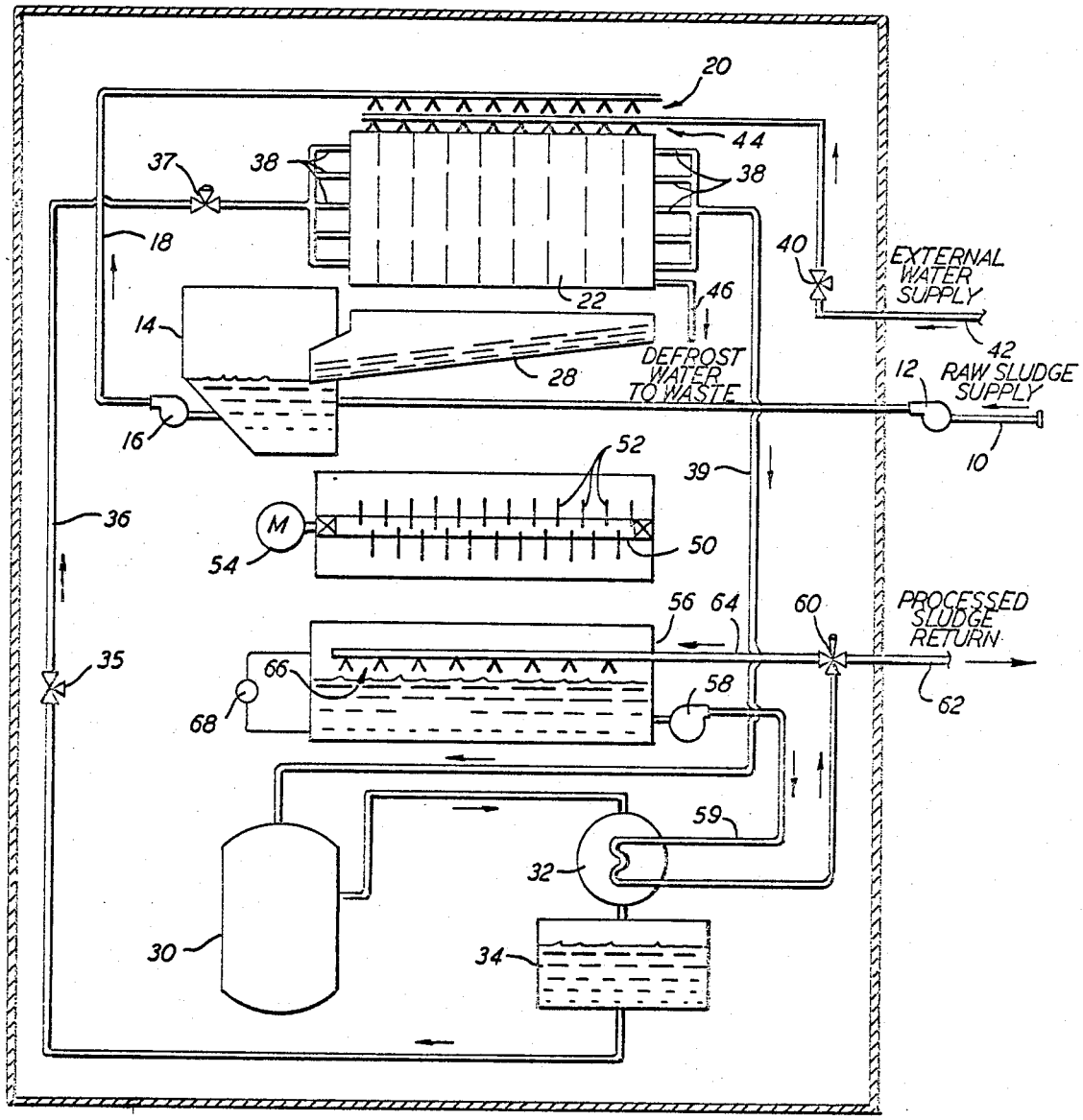
FIG. 1 is a somewhat diagrammatic illustration of the apparatus used in practising the process of the invention, also serving to illustrate the steps in the process.

While the major portions of plates 22 are arranged in vertical planes, lower portions 26 thereof are inclined inwardly so that the lower edges are disposed above trough 28. Liquid sludge which is not frozen on the surfaces of plates 22, in a manner described later, flows off the plates and is directed by movable dampers 29, in the solid line position of FIG. 2, into trough 28. As seen in FIG. 1, trough 28 is inclined to return the sludge to tank 14 for recirculation back to header 20 and plates 22.

A standard refrigeration circuit is provided by compressor 30, condenser 32 and receiver 34 to circulate a conventional refrigerant, such as R22, under control of solenoid valve 35, through supply line 36, expansion valve 37, a plurality of branch lines 38, and return line 39. Lines 38 are arranged in contacting relation to plates 22 to chill the surfaces thereof to a temperature below the freezing point of the sludge when refrigerant is circulated through the system. When pump 16 is actuated to start the flow of sludge through distribution header 20, valve 35 is also actuated to allow circulation of refrigerant. The temperature of recirculated sludge is lowered as it flows over the outer surfaces of plates 22 until it reaches freezing temperature, and is frozen upon the outer plate surfaces.

Recirculation continues for a predetermined time period, which is adjusted in accordance with process parameters to result in a desired portion of the recirculated sludge being frozen in sheets adhering to the vertically disposed outer surfaces of plates 22. Recirculation from tank 14 is then stopped and circulation of refrigerant continues for a further predetermined time period to insure complete solidification of the frozen sludge on the outer surfaces of plates 22.

At the expiration of the further predetermined time period valve 35 is closed to stop circulation of refrigerant and solenoid valve 40 in line 42 is opened to allow externally heated water to flow through distribution header 44 to the inner surfaces of plates 22, thereby initiating the defrost portion of the process. The defrost water is collected at the bottom of the plates 22 and discharged to waste through line 46. The higher temperature of the defrost water raises the temperature of plates 22 sufficiently that the sheets of frozen sludge are released from the outer surfaces thereof. Since recirculated sludge freezes only upon the vertically disposed portions of the outer plate surfaces which, as seen in FIG. 2, are in vertical planes outside the side walls of trough 28, the sheets of frozen sludge fall by gravity to a mechanical ice breaker. Dampers 29 are mechanically shifted to the vertical position, shown in dotted lines in FIG. 2, to allow the ice to fall into the breaker.

Means for mechanically breaking the sheets of frozen sludge into relatively small particles having a maximum transverse dimension, for example, of one or two inches, are arranged to receive the frozen sheets which are released from the outer, vertically disposed surfaces of plates 22. A pair of wall members 48 is positioned below plates 22 and trough 28. The upper edges of walls 48 are spaced by a distance greater than that between the outer surfaces of plates 22 so that the sheets of frozen sludge released from the plates fall between the wall members and are directed by the inwardly sloping, upper portions thereof toward shaft 50, having rigid arms or bars 52 extending radially therefrom and rotatable by motor 54. Thus, the sheets of frozen sludge are broken up as they pass between walls 48 and are struck by bars 52 which pass through slots provided for such purposes in the walls as shaft 50 rotates.

The pieces of frozen sludge fall through the open space between walls 48, below shaft 50, into melt tank 56 which contains some amount of previously frozen and thawed sludge in the liquid state, i.e., above freezing temperature, at the beginning of and throughout the process. The relatively small size of the frozen sludge particles reduces the thawing time as the particles are immersed in the previously thawed sludge in tank 56. The thawed, liquid sludge is drawn from tank 56 by pump 58 and directed through line 59 which passes through condenser 32 in order that the sludge will absorb heat rejected by the refrigerant as it is condensed in the normal refrigeration cycle. Thawed sludge in line 59 which has picked up heat in condenser 32 is directed by valve 60 to either of lines 62 or 64.

Thawed sludge directed through line 64 is returned to melt tank 56 through spray nozzles 66 and, having been raised further above the freezing temperature by the heat absorbed in condenser 32, accellerates thawing of the frozen sludge particles in tank 56. A conventional level sensor, indicated diagrammatically at 68, controls actuation of valve 60 in accordance with the level of thawed sludge in tank 56. Valve 60 is positioned to direct thawed sludge through line 64, back to melt tank 56 until the level reaches a predetermined maximum, at which time the valve is actuated to direct the thawed sludge through line 62 to a settling area, e.g., a pond, lagoon or tank(s). Valve 60 is again actuated when the level in tank 56 has fallen to a predetermined minimum, and thawed sludge is returned to the tank, thereby insuring that there is always thawed sludge to effect melting of the frozen particles deposited in the tank.

The thawed sludge directed to the settling area is allowed to stand for a period of time sufficient to permit phase separation to a desired degree, at which time the liquid phase may be drained and directed to the point of use or other storage area. The liquid phase, of course, in the context of the present invention, is water having a solids content not greater than a predetermined maximum e.g., 100 mg/L. The solids remaining after removal of the liquid phase may be further dried by evaporation, filtering, etc., if desired, and may be disposed of in landfill operations, or other desired means.

It should be noted that significant economies are achieved in the hardware and controls for carrying out the process of the invention by utilizing commercially available refrigeration equipment. Essentially all of the apparatus for both freezing the sludge in sheet form and breaking the frozen sheets into smaller pieces is used in commercial ice making operations where the broken particles are the final product. The present invention requires modification of the standard ice freezing and breaking equipment by adding flexible strips 24 and dampers 29. In addition, melt tank 56, pump 58, lines 59, 62 and 64, valve 60, spray nozzles 66, and level sensor 68 are provided, together with appropriate controls, including means for actuating valve 60 in response to signals from sensor 68. Also, the refrigerant condenser must be modified as required for passage therethrough of line 59 for transfer of heat from the refrigerant to the thawed sludge. The openings or nozzles of distribution header 20 may also require modification, or at least appropriate adjustment in order to accommodate the flow of metal hydrozide sludge, rather than the more or less purified water normally used in commercial ice making.

What is claimed is:

1. A system for receiving metal hydroxide sludge from a raw sludge supply and separating said sludge into primarily solid and liquid phases, said system comprising, in combination:

(a) a first tank in which said raw sludge from said supply is deposited;

(b) at least one pair of essentially flat, heat conducting plates arranged in spaced, parallel relation with inwardly and outwardly facing, vertically disposed, major surfaces;

(c) a first distribution header positioned above said plates to discharge liquid downwardly upon said outwardly facing plate surfaces;

(d) a first line connecting said first tank with said first header to conduct said raw sludge thereto for discharge onto said outwardly facing plate surfaces;

(e) means for chilling said plates to a temperature below the freezing point of said raw sludge, whereby some of said raw sludge is frozen on and adheres to said outwardly facing plate surfaces, and some drains by gravity off the lower portions of said plates;

(f) means for directing said raw sludge which drains off said plates back to said first tank for recirculation through said first header;

(g) means for releasing the frozen sludge from said outwardly facing plate surfaces, permitting said frozen sludge to fall from said plate surfaces by gravity;

(h) breaking means positioned below said plates to receive said frozen sludge released from said plate surfaces, and break the frozen sludge into pieces not larger than a predetermined size; and to discharge said pieces;

(i) a second tank positioned to receive said pieces of frozen sludge discharged from said breaking means;

(j) means for increasing the temperature of said pieces of frozen sludge in said second tank to effect thawing thereof;

(k) a second line through which thawed sludge from said second tank is circulated out of and back to said second tank; and (l) a third line through which thawed sludge from said second tank is circulated to a processing area for separation into said primarily solid and liquid phases.

2. The system of claim 1 wherein said means for chilling said plates comprises a refrigeration system having a compressor and condenser for operating on a refrigerant which passes through lines in contact with said plates, and said means for increasing the temperature of said frozen sludge comprises a portion of said second line passing through said condenser for transfer of heat rejected by said refrigerant to said thawed sludge in said portion of said second line which is circulated back to said second tank.

3. The system of claim 2 wherein said third line is joined to said second line, and further including a valve movable to direct said thawed sludge from said second line either back to said second tank or into said third line.

4. The system of claim 1 wherein said means for directing raw sludge back to said first tank comprises baffle means selectively movable between first and second positions, respectively in and out of the downward extension of the planes of said outwardly facing, vertically disposed, plate surfaces.

5. The system of claim 4 wherein said baffle means comprise a pair of dampers having respective surfaces arranged in downwardly converging relation when said dampers are in said first position.

6. The system of claim 5 wherein said dampers are hingedly mounted for movement about axes outside the planes of said plate surfaces, said axes being parallel to one another and to said plate surfaces.

7. The system of claim 1 and further comprising means cooperable with said first distribution header to distribute said raw sludge essentially evenly along upper portions of said outwardly facing plate surfaces.

8. The system of claim 7 wherein said cooperable means comprise a pair of flexible strips extending parallel and adjacent to respective ones of said plate surface upper portions below said first distribution header, whereby raw sludge discharged therefrom passes between said flexible strips and said plate surface upper portions to flow down said plate surfaces.

9. The system of claim 1 wherein said means for releasing said frozen sludge comprises a second distribution header positioned above said plates to discharge liquid downwardly upon said inwardly facing plate surfaces, whereby the temperature of said plates may be increased to release said frozen sludge by directing liquid having a temperature above the freezing temperature of said sludge through said second distribution header to flow downwardly over said inwardly facing plate surfaces, and drain by gravity off the lower portions of said plates.

10. The system of claim 9 and further including means for directing said liquid which drains off said plates to a separate location from said raw sludge which drains off said plates.

11. The system of claim 10 wherein said breaking means comprises a pair of side walls, open at the top and bottom, and a plurality of rotating arms for breaking said frozen sludge, positioned between said plates and said second tank, whereby said frozen sludge released from said plates falls into said open top and said pieces of frozen sludge fall through said open bottom into said second tank.

12. The system of claim 11 and further including a third distribution header connected to said second line and through which said thawed sludge is returned to said second tank.

* * * * *